Oct. 13, 1970     P. F. SCHUTT     3,534,202
THERMIONIC CONVERTER
Filed Aug. 24, 1967

INVENTOR.
Paul F. Schutt
BY
J. Maguire
ATTORNEY

United States Patent Office 3,534,202
Patented Oct. 13, 1970

3,534,202
THERMIONIC CONVERTER
Paul F. Schutt, Oakridge, Tenn., assignor to The Babcock & Wilcox Company, New York, N.Y., a corporation of New Jersey
Filed Aug. 24, 1967, Ser. No. 662,996
Int. Cl. H01j 45/00
U.S. Cl. 310—4                                 18 Claims

ABSTRACT OF THE DISCLOSURE

An arrangement for controlling a thermionic converter having a cathode heated by the thermal energy developed in a nuclear reactor. The converter comprises a container within which a pair of electrodes is disposed, including a cathode surrounded by an anode for collecting electrons thermionically emitted from the cathode. The container is insulated from the anode by a gas and/or gas permeable substance. A pressure regulating device is connected in gas flow comunication with container for increasing and decreasing the pressure of the gas between the anode and container thus changing the heat transfer characteristic of the gas.

BACKGROUND AND SUMMARY OF THE INVENTION

The temperatures produced in a nuclear reactor far exceed those obtainable from the combustion of conventional fuels. As a result, for some applications, new materials have been used to construct conventional heat exchangers operable at the elevated temperatures, while in other applications conventional heat exchangers have been used in combination with thermionic converters to directly convert thermal energy to electrical energy. For example, Pat. No. 3,234,412 describes a thermionic converter used as an elevated temperature heat exchanger integrated with a conventional indirect heat exchanger.

Thermionic converters enclosed within nuclear reactors have heretofore been controlled by varying the temperature and pressure characteristics of the reaction process. This mode of control is highly undesirable. For example, consider a reactor without a thermionic converter. In such a reactor it is inherently difficult to adjust temperatures and pressures to uniform levels, since structural variations from one area to another within the reactor give rise to perturbations in temperature levels, primary coolant pressure and power gradients. The problem is compounded by adding a thermionic converter to the system and attempting to control its output by varying the temperature and pressure levels within the reactor. Further, when a plurality of thermionic converters are electrically interconnected together it is desirable to adjust the output of one or more of the converters without affecting the others. To make such an adjustment by controlling reactor temperatures and pressures has thus far been an insurmountable problem.

The present invention is concerned with a controlled thermionic converter and more particularly with controlling a thermionic converter without altering the normal temperature and pressure gradients within a nuclear reactor.

Thermionic converters are devices used to directly convert the thermal energy of a heated material to electrical energy. In simplest form a thermionic converter is a tube comprising to electrodes of different metals spaced apart from one another in an enclosure and adapted to be electrically connected to one another externally of the enclosure through an electrical load. One of the electrodes, called a cathode, is heated to cause electrons to be emitted which flow to the other electrodes, called an anode, because of the different electromotive characteristics of the anode and cathode metals. The anode serves as an electron collector from which the electrons return to the cathode through the electrical load. In transit through the load the electrons give up useful energy to perform work.

As electrons leave the cathode a cloud of electrons, called a space charge, develops in the interelectrode space. The space charge repels electrons subsequently emitted from the cathode, preventing their flow to the anode. The rate of flow of electrons per unit of time, or current, is thus seriously affected by the space charge. In practice, desired currents may be obtained by closely spacing the electrodes to minimize the effect of space charge or introducing an easily ionizable substance into the interelectrode space for neutralizing the space charge to form a neutral plasma through which electrons freely flow.

Thermionic converters are generally classified by the mechanism employed for reducing the effects of space charge. The theory of operation of closely spaced electrode configuration is generally well understood and design charts and procedures have been published for their applications. On the other hand, no one theory can fully explain the operation of the neutral plasma configurations. The following discussion sheds some light on the problems solved and results achieved by the inventive neutral plasma configuration herein disclosed.

The work function of the surface of a metal is a quantity related to the energy required for an electron to leave the surface. If the metal is sufficiently heated, the thermal energy supplied to the electrons will cause some of them to leave the metal. Thus it may be said that the number of electrons emitted is a function of the temperature and work function of the metal. Consider a cathode and anode spaced apart in an enclosure having an easily ionizable substance such as a small amount of cesium metal vapor in the interelectrode space. As the cathode is heated the electrons given off ionize the vapor which neutralizes the space charge and contributes substantially to the number of electrons flowing to the anode.

The difference in potential between the anode and cathode is a function of the difference in the work functions of their respective surfaces. Assuming the temperature of the cathode remains substantially constant and the current remains constant, the voltage from anode to cathode cannot be altered without changing the work function of either the cathode or anode. The inventive arrangement controllably alters the work function of the anode surface of a thermionic converter during operation by causing a greater or lesser amount of cesium to be deposited on the anode surface. The result is achieved by varying the temperature of the anode to cause more or less cesium to be deposited on the anode surface. It is thought that the mechanism for depositing cesium is analogous to the manner in which water vapor collects on the surface of glass cooled to a given temperature but does not so collect when the glass is sufficiently heated.

The inventive device generally comprises a container in which the anode enclosed a cathode and is spaced apart therefrom. The anode work function is lower than that of the cathode. An alkali metal vapor is disposed in the space intermediate the cathode and anode, and the container is insulated from the anode with a gas and/or gas permeable substance. Means are provided for varying the pressure of the gas, thus varying the insulating characteristic thereof. As the cathode is heated electrons are emitted and the temperature of the anode rises. The anode temperature will increase to substantially the same temperature of the cathode if the heat is not dissipated to the container. By adjusting the pressure of the gas intermediate the anode and container the heat transfer characteristic of the gas as an insulator may be altered and the temperature of the anode reduced. The colder the anode, the greater the tendency of the alkali metal vapor to deposit on the anode surface. The work function of the anode surface thus approaches the work function of the metal vapor as the anode is cooled. Since voltage from anode to cathode depends on the difference between the work functions of their respective surface, the voltage changes as the gas pressure is varied.

DESCRIPTION OF THE PREFERRED EMBODIMENTS

Figure 1:
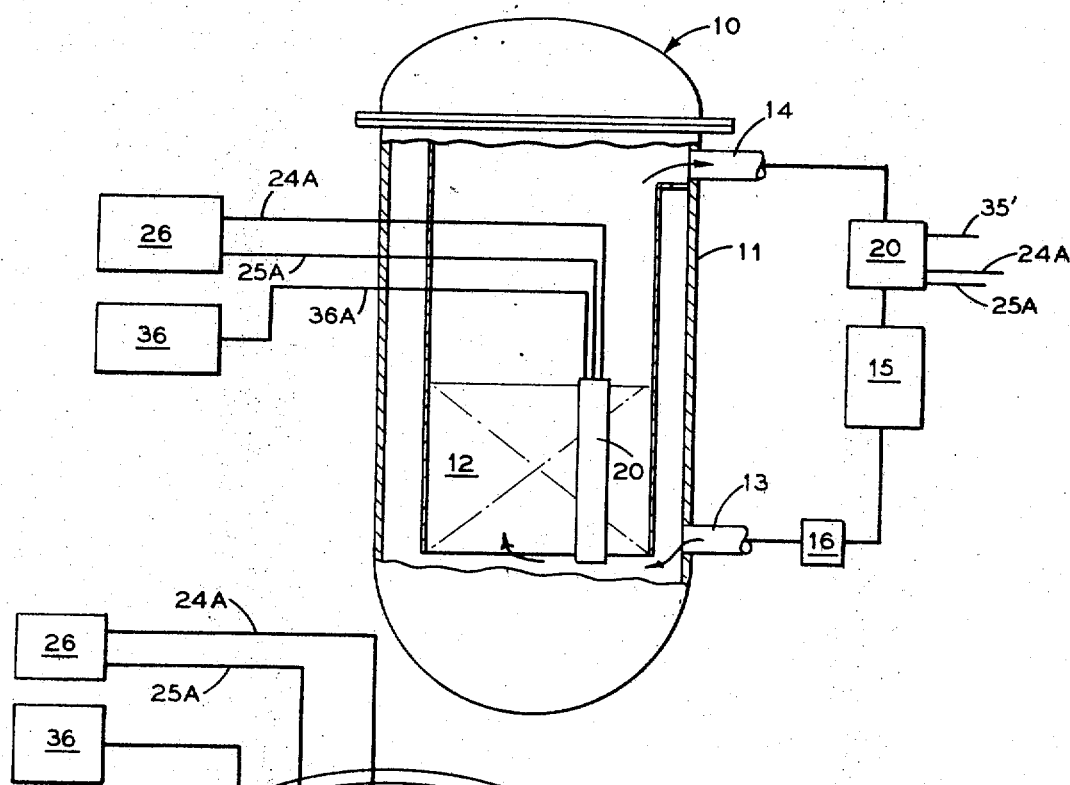
FIG. 1 is a schematic view of a nuclear reactor which embodies the inventive device.

Referring now to the drawings wherein like references designate like or corresponding parts throughout the several views there is shown in FIG. 1 a nuclear reactor 10 in fluid flow communication with a heat exchanger 15. The reactor 10 generally comprises a pressure vessel 11 within which there is disposed a plurality of nuclear fuel elements, moderating material as necessary, and associated structure well known in the art for forming a fluid permeable reactor core 12. The vessel 11 is provided with an inlet 13 and outlet 14, and is adapted to be connected to a circulating means well known in the art 16 for continuously circulating primary coolant into the vessel inlet 13, through the core 12, out of the vessel outlet 14, through the exchanger 15, and back to the vessel inlet 13. Useful energy in the form of heat generated by the fission process is transferred to the coolant as it passes through the vessel 11 and extracted from the coolant as it passes through the heat exchanger 15.

Figure 2:
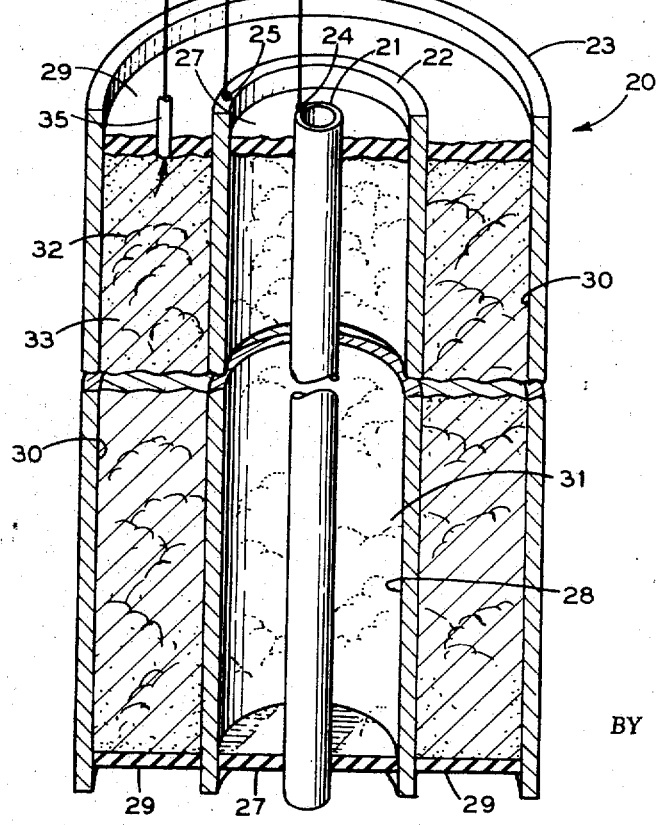
FIG. 2 is a cross-sectional view of the inventive device.

Referring particularly to FIG. 2, there is shown a thermionic device 20 for converting useful energy in the form of heat generated by the fission process, to electrical energy. The device 20 generally comprises an elongated hollow cathode 21, an elongated annular anode 22 surrounding the cathode 21, and a substantially cylindrically shaped container 23 surrounding the anode 22. It is seen that the cathode is substantially concentrically disposed with respect to the anode. The cathode and anode are respectively provided with electrical terminals 24 and 25 for connecting the thermionic device 20 to an electrical load 26 by via leads 24A and 25A respectively. The anode 22 is spaced apart from the cathode 21 by a first pair of spaced opposing insulators 27 sealed to the anode 22 and cathode 21 to form an annularly shaped first chamber 28 therebetween, and the container 23 is spaced apart from the anode 22 by a second pair of spaced opposing insulators 29 sealed by the container 23 and anode 22 to form a similarly shaped second chamber 30 intermediate the container and anode.

An alkali metal vapor 31 is disposed within the first chamber 28 while gas 32, alone or together with a gas permeable substance 33, is disposed within the second chamber 30. The gas 32 acts as a variable insulator between the container 23 and anode 22. The second chamber 30 is provided with an orifice 35 adapted to be connected in gas flow communication with a source of pressure regulated gas 36 via a conduit 36A. The source 36 may be adjusted for controlling the pressure of the gas 32 within the second chamber 30. Varying the gas pressure within the chamber 30 causes the heat transfer characteristic of the gas to change thus varying the effectiveness of the insulation between the anode 22 and container 23. As hereinbefore described, changes in anode temperature give rise to changes in voltage between terminals 24 and 25.

In the preferred embodiment the gas 32 is a noble gas selected from the group consisting of oxygen, helium, nitrogen, neon, xenon, argon and krypton or combinations thereof; the gas permeable substance 33 is preferably a solid insulating material of high gas porosity, such as a graphite wool, ceramic sponge or ceramic powder which is pressurizable by the gas; and the alkali metal vapor is preferably cesium metal vapor.

As shown in FIG. 1, the thermionic device 20, or a plurality thereof, electrically connected in series/and/or parallel, may be situated within the reactor. In this embodiment nuclear fuel is deposited within the cathode and the opposite ends of the cathode seal welded to enclose the fuel therewithin. Primary coolant flows outside the container for cooling the same. The electrical terminals 24, 25 of the device 20 are electrically connected to leads 24A and 25A extending externally of the pressure vessel for connection to an external electrical load 26 such as a D.C. motor. In the event that a plurality of devices 20 are electrically connected together as hereinbefore described, leads 24A and 25A or a plurality thereof may be connected as desired to the plurality of terminals 25, 26 or junctions formed therebetween by means well known in the art for connection to an electrical load 26 or plurality thereof located externally of the reactor.

As another arrangement, it is a feature of the invention to dispose the device 20' externally of the reactor and circulate primary coolant through the cathode. For this purpose the cathode may be formed as an open ended conduit through which primary coolant is circulated. For example, the thermionic device 20' may be connected in fluid flow communication with the heat exchanger 15 as shown in FIG. 1. Further, it is within the scope of the invention to dispose a device 20, or devices, within the reactor and a device 20', or plurality thereof, externally of the reactor. When a device 20' is located externally of the reactor the container may be provided with radial fins (not shown) and exposed to the atmosphere for cooling, or cooled by means of passing a secondary coolant thereover as is well known in the art. In any of the arrangements it is understood that the temperature of the anode is generally substantially greater than the temperature of the medium circulated externally of the container, be it air or coolant.

The pressure regulating means 36 is a means well known in the art located externally of the reactor and interconnected with the orifice, or orfices of the converter or converters as the case may be. The regulator 36 may be interconnected in series and/or parallel gas flow communication with the orifices of the converter and/or converters as located within and/or outside of the reactor, as the case may be, to adjust the pressure of gas within the second chamber or chambers of the converter or converters or individually as necessity dictates, without departing from the spirit and scope of the invention. Further, it is understood that a plurality of regulators 36 may be used to adjustably regulate the gas pressure within the second chamber or chambers of the converter or converters without departing from the spirit and scope of the invention.

What is claimed is:

1. An improved thermionic converter comprising a cathode, an anode spaced apart from the cathode and insulated therefrom to form a first chamber intermediate the cathode and anode, a container spaced apart from the anode and insulated therefrom to form a second chamber intermediate the container and anode, and an alkali metal vapor disposed within the first chamber, wherein the improvement comprises, a gas in the second chamber, the gas acting as a variable insulator between the anode and container, and the second chamber adapted to be connected to means for varying the gas pressure.

2. The converter according to claim 1 wherein the cathode is a hollow member, a nuclear fuel is disposed within the cathode, and the cathode is sealed.

3. The converter according to claim 1 wherein the cathode is an open ended conduit.

4. The converter according to claim 1 wherein the alkali metal vapor is cesium metal vapor.

5. The converter according to claim 1 wherein the gas is a noble gas.

6. The converter according to claim 1 wherein the cathode, anode and container are substantially cylindrically shaped members concentrically disposed with respect to one another, the cathode and anode are respectively provided with electrical terminals for connecting the device to an electrical load, the anode is spaced apart from the cathode by a first pair of spaced opposing insulators sealed to the anode and cathode to form the first chamber between the anode and cathode, the container is spaced apart from the anode by a second pair of spaced opposing insulators sealed to the container and anode to form the second chamber between the container and anode, the gas is an insulating means the pressure of which may be varied to vary the output voltage of the converter, and the second chamber is adapted to be connected to a means for varying the pressure of the gas within the second chamber.

7. The converter according to claim 1 wherein the second chamber is substantially filled with a gas permeable material.

8. The converter according to claim 7 wherein the alkali metal vapor is cesium metal vapor.

9. The converter according to claim 1 in combination with means for varying the gas pressure.

10. In a nuclear reactor an improved thermionic converter comprising a cathode, an anode spaced apart from the cathode and insulated therefrom to form a first chamber intermediate the cathode and anode, a container spaced apart from an anode and insulated therefrom to form a second chamber intermediate the anode and container, and an alkali metal vapor disposed within the first chamber, wherein the improvement comprises, a gas in the second chamber, the gas acting as a variable insulator between the anode and container, and the second chamber adapted to be connected to means for varying the gas pressure.

11. The converter according to claim 10 wherein the cathode is a hollow member, a nuclear fuel is disposed within the cathode, and the cathode is sealed.

12. The converter according to claim 10 wherein the cathode is an open ended conduit.

13. The converter according to claim 10 wherein the alkali metal vapor is cesium metal vapor.

14. The converter according to claim 10 wherein the gas is an anode insulating means.

15. The converter according to claim 10 in combination with means for varying the gas pressure.

16. The combination according to claim 15 wherein the means for varying the gas pressure is located externally of the reactor.

17. The converter according to claim 16 wherein the means for varying the gas pressure is a means other than means for varying the temperature characteristics of the reaction process.

18. The converter according to claim 16 wherein the means for varying the gas pressure is a means other than means for varying the pressure characteristics of the reaction process.

References Cited

UNITED STATES PATENTS

| | | | |
|---|---|---|---|
| 3,093,567 | 6/1963 | Jablonski et al. | 310—4 X |
| 3,234,412 | 2/1966 | Sankovich et al. | 176—39 X |
| 3,270,802 | 9/1966 | Lindberg | 165—96 X |
| 3,304,232 | 2/1967 | Schutt | 310—4 X |
| 3,330,974 | 7/1967 | Wilson | 310—4 |
| 3,341,719 | 9/1967 | Burhorn et al. | 310—4 |

FOREIGN PATENTS 854,036   11/1960   Great Britain.

MILTON O. HIRSHFIELD, Primary Examiner

D. F. DUGGAN, Assistant Examiner

U.S. Cl. X.R.

165—96